United States Patent

[11] 3,610,892

[72] Inventor James R. Fiannaca
Rochester, N.Y.
[21] Appl. No. 822,128
[22] Filed May 6, 1969
[45] Patented Oct. 5, 1971
[73] Assignee Metrix Data Systems, Inc.
Rochester, N.Y.

[54] ANALOG-TO-DIGITAL DATA PROCESSING SYSTEM

16 Claims, 10 Drawing Figs.

[52] U.S. Cl. ........ 235/61.11R, 340/347 P
[51] Int. Cl. ........ G06k 7/015
[50] Field of Search ........ 235/61.11, 61.111, 61.12, 61.112, 61.114, 61.115; 340/347

[56] References Cited
UNITED STATES PATENTS
3,096,551 7/1963 Taras ........ 235/61.114 UX
3,564,540 2/1971 Evans ........ 340/347

*Primary Examiner*—Maynard R. Wilbur
*Assistant Examiner*—William W. Cochran, II
*Attorney*—Cumpston, Shaw & Stephens

ABSTRACT: Elements in a recorder move through an infinite number of locations as an analog function of a process and are actuated at a selected time to make record bits in a record medium corresponding to the elements' locations at the selected time. The record bits are long enough in the direction of travel of the elements to overlie at least one of the digital data areas of sensitivity of a digital reader that senses the record bits and is programmed to acknowledge a single value for each of the bits, even when a bit overlies more than one digital data area.

INVENTOR.
JAMES R. FIANNACA
BY Cumpston, Shaw & Stephens
ATTORNEYS

INVENTOR.
JAMES R. FIANNACA
BY Cumpston, Shaw & Stephens
ATTORNEYS

ANALOG-TO-DIGITAL DATA PROCESSING SYSTEM

THE INVENTIVE IMPROVEMENT

Many digital recording and reading machines are available for processing data bits having values assigned according to the location of each bit in a record medium. Examples include equipment for processing punched cards, punched tape, magnetic tape, embossed records, electrically conducting records, and optical or photographic records. In such equipment a record bit is located in a predetermined place to give the bit an assigned value, and both the recorder and the reader are responsive to location of record bits for processing the recorded data.

Such equipment requires digital input of information to the recorder. A record bit must be located in one of the predetermined digital data areas of the record medium and not in between such areas. Unfortunately, digital data is desired for many processes that are infinitely variable or continuous. The data from such processes is nondigital or analog. Such processes include metering the flow of material or electricity and measuring the contents of containers, weights, distances, etc. At any given instant of time, a monitor or indicator for such a process may not be able to produce a precise digital value for the state of the process. Digital reading indicators are used for many of such processes and a common example is an automobile odometer. At any instant of the advancement of a digital indicator, some of its elements may be between digital positions and in motion from one digit position to another. Hence interpretation is necessary in reading such an indicator, and such information is not suitable for direct input into a digital recorder without adjustment to bring each element precisely to a digital data location.

Partly because of these problems, many processes still require meter reading by humans, or human adjustment of digital indicators to enable a digital printout or digital recording of the value of the process at any given instant. Examples of this are utility meters, fuel delivery meters, and weighing and measuring equipment.

The general object of the invention is to provide an analog-to-digital data processing system that permits direct input to a recorder from an analog or infinitely variable process to produce a record medium that is readable by a digital reader. This eliminates any human intervention between the process and the digital data on its values. The invention also aims at reliability, security, simplicity, economy, and other desirable characteristics for such a system.

SUMMARY OF THE INVENTION

The invention involves recognizing the possibility of locating record bits anywhere on or between digital data areas as an analog function of a process, and relating the bits to a program so they can be read with a conventional digital reader that distinguishes between digit date areas and is still able to resolve ambiguities as to position value. This is a sharp departure from the consistent practice of locating and reading record bits only in predetermined digital data areas. It is made possible according to the invention by making the record bits sufficiently large to overlie at least one digital data area regardless of their position along a path of travel, and the digital reader is programmed to acknowledge a single value for each of the record bits, even when one of the record bits overlies more than one of the digital areas.

Preferably, the record bits are made long enough in the direction of travel of the recording elements that formed them to extend across two digital data areas and the intervening space. This insures that the record bits overlie at least one digital data area at all times. When such record bits overlie two or more digital data areas sufficiently to produce reader ambiguity, this is resolved by the reader looking to the value of a controlling record bit. For a multidigit number, the controlling record bit is preferably the next lower digit place of the number.

DRAWINGS

DETAILED DESCRIPTION

The inventive data processing system can use several different record media and recording devices. This will be explained more fully below, but for a general understanding of the concepts involved, FIGS. 1–4 show the inventive system applied to punched cards.

Figure 1:
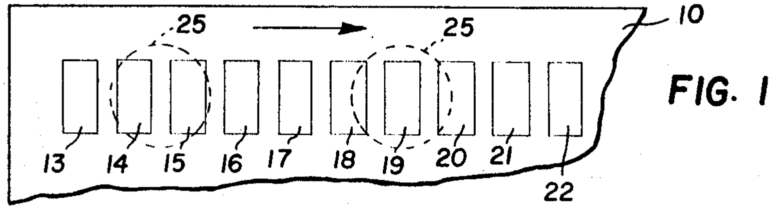
FIGS. 1–4 are schematic, fragmentary plan views of record media marked according to the inventive system.
Figure 2:
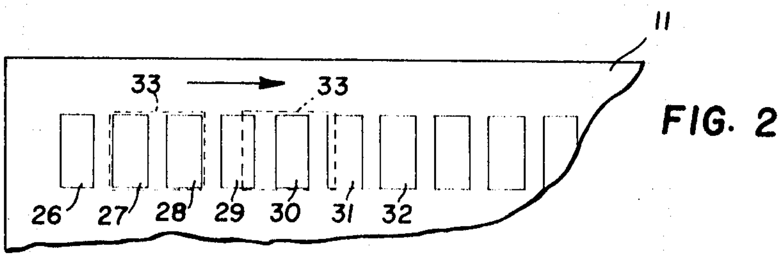
Figure 3:
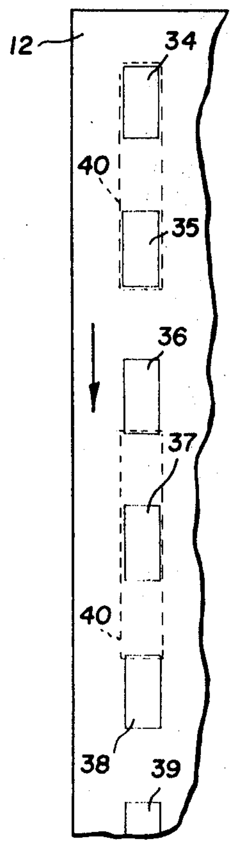

Record media 10–12 of FIGS. 1–3 are punch cards for business machine operations. A row of digital data areas 13–22 is arranged on card 10 in a conventional pattern so that card 10 can be fed through conventional digital reading equipment sensitive to holes punched in card 10. Such reading equipment is able to distinguish between digital data areas 13–22 for acknowledging a value for a hole punched in any of such areas.

Ordinarily recording equipment using card 10 would be arranged for punching out one of the digital data areas 13–22 corresponding to the digital value of the record bit to be stored in card 10. The invention departs from such a common practice and makes a record bit in card 10 in a different manner. A card punching element such as one of the elements 52–56 schematically represented in FIG. 10 travels over the row of digital data areas 13–22 in the direction of the arrow as a function of an infinitely variable or analog process such as a measurement. In the course of such travel, the punch element occupies an infinite number of locations along the digital data row as the process continues. Actuation of the punch at any given instant of the process produces a record bit 25 that may be between digital data areas as well as registered with one of them. However, the size or length of record bit 25 is made large enough in the direction of the arrow so that at any location along the path, record bit 25 overlies at least one of the digital data areas 13– 22.

At one illustrative position on card 10, record bit 25 is centered between digital data areas 14 and 15, and punching out of record bit 25 at such position would remove large portions of digit areas 14 and 15. At another position on card 10, record bit 25 is centered on digital data area 10 where a punching would remove the entire digital data area 19 and small portions of adjacent data areas 18 and 20. The two positions of record bit 25 on card 10 illustrate the extremities of its relationships with successive digital data areas 13–22. Inumerable intermediate relationships exist between the two illustrated extremes. In any position along the row of digital data areas 13–22, record bit 25 will overlie a substantial portion of at least one of the digital data areas.

Card 11 shows a similar row of digital data areas 26–32 with a record bit 33 that can be punched out as a rectangle or square rather than as a circle. In one position on card 11, record bit 33 is centered between digit areas 27 and 28, and in another position, record bit 33 is centered on digit area 30. Record bit 33 is long enough in the direction of travel shown by the arrow to extend across two adjacent digit areas and the intervening space such as illustrated by the registry of record bit 33 with digit areas 27 and 28. This assures that in any position of travel along the row of digit areas 26–32, record bit 33 overlies substantially all of at least one data area.

Card 12 of FIG. 3 shows a row of data areas 34–39 arranged longitudinally for a punch to advance downward in the direction of the arrow. Record bit 40 is long enough in the direction of advancement to overlie two subsequent data areas and the intervening space as illustrated in its registry with data areas 34 and 35. In another position, record bit 40 is centered on data area 37. The shape of record bit 40 assures that in any location along the row of data areas 34–39, at least one data area will be punched out.

As illustrated in FIGS. 1–3, part or all of several data areas may be punched out with each record bit. This means that a digital reader may sense more than one digit area for any one record bit, and it creates some ambiguity as to the reading of record bits. This is resolved as best explained with reference to FIG. 4.

Figure 4:
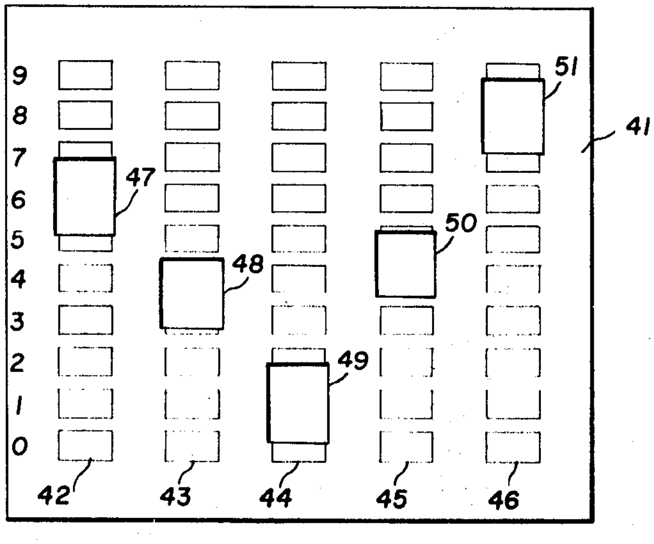

Card 41 of FIG. 4 is punched for recording a five-place decimal number with the record bit placement described for FIG. 2. Card 41 has five columns 42–46 each containing 10 digital data areas and each punched to record a respective record bit 47–51. Record bits 47–51 are preferably made by an array of punches 52–56 as shown schematically in FIG. 10 for traveling across card 41 and returning for successive courses of travel. Card 41 can be used to record the state or measurement of a continuous process such as delivery of water, gas, oil, electricity, or solid material, or measurement of contents, weight, material, size, etc.

The columns on card 41 are for recording units in column 46, tens in column 45, hundreds in column 44, thousands in column 43, and ten-thousands in column 42. Record bit 47 is centered on the digit 6 data area of column 42 and also punches out portions of the 5 and 7 digit areas of column 42. A conventional reader will acknowledge the value 6 and may also sense a 5 and a 7. For any sensing of three values in a column, the reader is programmed to acknowledge only the central value; hence, column 42 is read for a 6 value.

Record bit 48 in column 43 overlies data areas 3 and 4 so that large portions of both of such areas have been punched out. A digital reader would sense both the values 3 and 4 for column 43. To resolve such ambiguity, the reader is programmed to correlate the position of the punchout in next lower column 44 where record bit 49 serves as a control for any ambiguity in the position of record bit 48. Since record bit 49 is on the 1 data area, it is apparent that recording element 54 has just completed a course of travel across row 44 and has made a fresh start from 0 position. This means that record bit 48 should be construed as a 4 rather than a 3, since record bit 48 should advance one digit area for each complete course of travel of record bit 49 or recording element 54. The reader is programmed for this result.

Along with portions of the 0 and 2 digit areas, the 1 digit area of column 44 is punched out by record bit 49, so the digital reader is programmed to acknowledge only the central 1 value for the three values sensed in column 44.

Record bit 50 of column 45 overlies digit areas 4 and 5 to punch out large portions of both such areas and produce an ambiguity as to its value. This is resolved in the same way that such an ambiguity was resolved for record bit 48 by looking to the next lower record bit, which in this case is record bit 51 in units column 46. Since record bit 51 is located on digit area 8, indicating a nearly complete course of travel of recording element 56 across column 46, it is clear that a reading of a 5 value for record bit 50 in column 45 is premature. Hence, the digital reader is programmed to correlate the high value of controlling record bit 51 in reading a 4 value for record bit 50.

An ambiguity as to the location of record bit 51 in column 46 is resolved by programming the reader to accept either the highest or the lowest value sensed. This is satisfactory because record bit 51 is located in units column 46 where ambiguity as to its position is of minor importance. Also, for any process in which cumulative readings are made, the resolution of ambiguous readings in the units column by taking either the higher or lower value sensed will not accumulate errors from successive readings.

A reader programmed according to the invention will sense punchouts 47–51 and acknowledge the number 64,148.

Once the principal concepts of the inventive marking and reading system are clear, it is easy to see that they apply to a variety of recording media and forms of record bits. These are illustrated schematically in FIGS.5–9.

Figure 5:
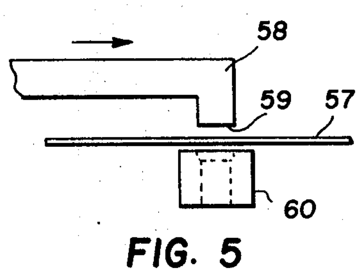
FIGS 5–9 are schematic, fragmentary, elevational views of different record marking devices usable with the inventive system.

Record card 57 of FIG. 5 is arranged for punching or embossing as described in FIGS 1–4. Recording element 58 is advanced in successive runs in the direction of the arrow across record card 57. A male die 59 on recording element 58 cooperates with a female die 60 arranged under record card 57 for punching or embossing the desired record bit.

Figure 6:
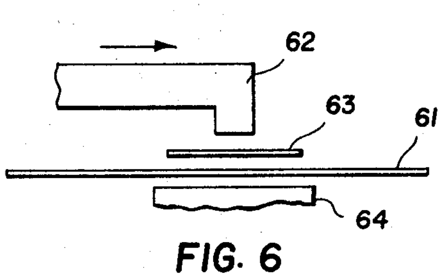

Record card 61 of FIG. 6 is arranged to receive a printed or deposited mark made by recording element 62 advancing in the direction of the arrow over card 61. A ribbon 63 containing ink or other depositable material is disposed under recording element 62 so that when element 62 is pressed against card 61 and backing element 64, it deposits material from ribbon 63 on card 61 to form the desired record bit. The material from ribbon 63 can be an ink or an electrically conductive material, and the resulting record bit can be sensed optically or electrically.

Figure 7:
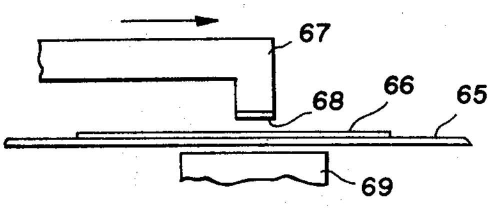

Record card 65 of FIG. 7 bears a magnetic strip 66, and recording element 67 carries a magnet 68 for magnetizing a record bit area of strip 66 when element 67 is pressed against card 65 supported by backup element 69. The resulting record bit in strip 66 is read by digital magnetic reading equipment.

Figure 8:
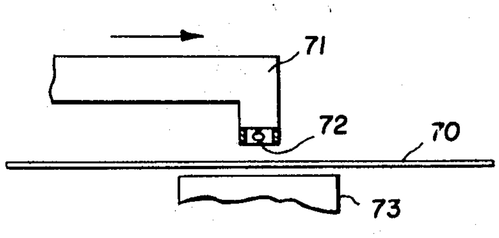

Record card 70 of FIG. 8 is preferably photosensitive, and recording element 71 contains a light source 72 for exposing photographic element 70 which is supported by a backup element 73. Actuation of light source 72 is controlled to form a record bit of the desired size and location. Card 70 could also be formed of paper or other insensitive material for receiving a record bit formed by a xerographic or other copying process.

Figure 9:
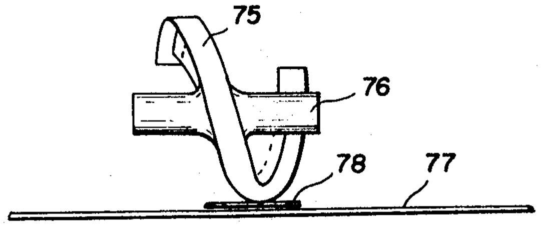

FIG. 9 shows a record printing surface 75 formed as a helix around axle 76 so that the axial position of surface 75 relative to card 77 depends on the rotational position of axle 76. Surface 75 is wide enough so that when it presses ink ribbon 78 against record card 77 to make a record bit according to the invention, the record bit is long enough in the axial direction of axle 76 to overlie at least one of the digital areas arranged axially of axle 76 on card 77. SURFACE 75 can make a record bit in card 77 by printing, embossing, or magnetization.

Figure 10:
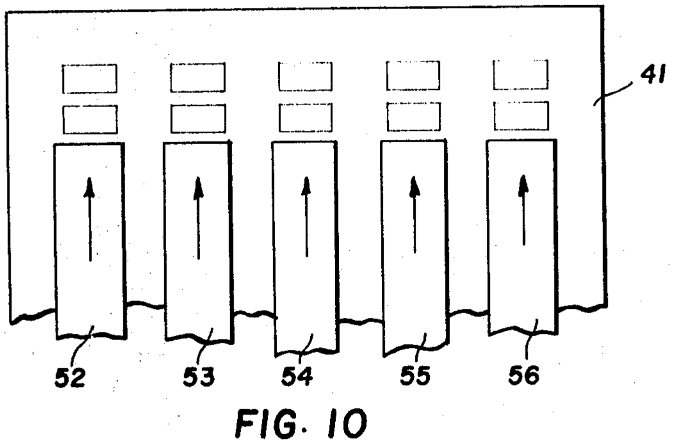
FIG. 10 is a fragmentary, schematic plan view of a five-place recorder and record medium for use in the inventive system.

FIG. 10 schematically shows five recording elements 52–56 arranged for moving over record card 41 to form the type of record illustrated in FIG. 4. Each of the recording elements 52–56 moves in the direction of the arrow across card 41 to a limit of travel from which it returns for another course of travel. Any of the recording elements 58, 62, 67, and 71 of FIGS. 5–8 can be arranged as shown in FIG. 10 for multicolumn recording on a record medium. Recording elements can also move rotationally or in other paths within the spirit of the invention.

Persons wishing to practice the invention should remember that other embodiments and variations can be adapted to particular circumstances. Even though one point of view is necessarily chosen in describing and claiming the invention, this should not inhibit broader or related applications within the spirit of the invention. For example, the inventive system can be applied to a wide variety of processes for which digital information is desired, and the specific marks, readings, and programmings can be adapted and refined to the particular uses.

I claim:

1. An analog-to-digital data processing system comprising:

a. a recording medium;

b. a recorder arranged to receive said medium;

c. a plurality of movable elements in said recorder;

d. means for actuating each of said elements to produce a record bit in said medium;

e. means for moving said elements relative to said medium through infinite numbers of locations as an analog function of a process;

f. means for actuating said elements at a selected time relative to said process to locate said record bits in said medium at the corresponding locations of said elements at said selected time;

g. a digital reader sensitive to said record bits and capable of distinguishing between predetermined digital data areas of said medium for acknowledging a different value for each of said digital data areas in which one of said record bits is sensed;

h. the length of said record bits in the direction of motion of said elements relative to said medium being sufficient so that each of said record bits overlies at least one of said digital data areas in any of said element locations; and i. programmable means for acknowledging one of said values for each of said record bits even when one of said record bits overlies more than one of said digital data areas.

2. The system of claim 1 wherein said length of said record bits is approximately the distance across two successive ones of said digital data areas and the intervening space.

3. The system of claim 1 wherein said reader is programmed to acknowledge the greater of two possible values for one of said record bits overlying more than one of said digital data areas if a low value is acknowledged for a controlling one of said record bits.

4. The system of claim 1 wherein said reader is programmed to acknowledge the lesser of two possible values for one of said record bits overlying more than one of said digital data areas if a high value is acknowledged for a controlling one of said record bits.

5. The system of claim 3 wherein each of said elements corresponds to a digit place in a decimal number, said controlling one of said record bits is in the next lower digit place relative to any but the lowest digit place, and said record bit in said lowest digit place serves itself as said controlling record bit.

6. The system of claim 3 wherein said length of said record bit is approximately the distance across two successive ones of said digital data areas and the intervening space.

7. The system of claim 1, wherein each of said record bits is one of: a mechanically sensible mark, an electrically sensible mark, a magnetically sensible mark, and an optically sensible mark.

8. The system of claim 1, wherein each of said record bits is one of: a punched hole, a printed ink mark, a magnetic mark in a magnetic medium, an embossed mark, an imprinted mark of electrically conducting material, and a photographic mark.

9. The system of claim 4 wherein each of said elements corresponds to a digit place in a decimal number, said controlling one of said record bits is in the next lower digit place relative to any but the lowest digit place, and said record bit in said lowest digit place serves itself as said controlling record bit.

10. The system of claim 4 wherein said length of said record bit is approximately the distance across two successive ones of said digital data areas and the intervening space.

11. The system of claim 2 wherein each of said record bits is one of: a mechanically sensible mark, an electrically sensible mark, a magnetically sensible mark, and an optically sensible mark.

12. The system of claim 3 wherein each of said record bits is one of: a mechanically sensible mark, an electrically sensible mark, a magnetically sensible mark, and an optically sensible mark.

13. The system of claim 4 wherein each of said record bits is one of a mechanically sensible mark, an electrically sensible mark, a magnetically sensible mark, and an optically sensible mark.

14. The system of claim 2 wherein each of said record bits is one of: a punched hole, a printed ink mark, a magnetic mark in a magnetic medium, an embossed mark, an imprinted mark of electrically conducting material, and a photographic mark.

15. The system of claim 3 wherein each of said record bits is one of: a punched hole, a printed ink mark, a magnetic mark in a magnetic medium, an embossed mark, an imprinted mark of electrically conducting material, and a photographic mark.

16. The system of claim 4 wherein each of said record bits is one of: a punched hole, a printed ink mark, a magnetic mark in a magnetic medium, an embossed mark, an imprinted mark of electrically conducting material, and a photographic mark.